(12) United States Patent
Bhakta et al.

(10) Patent No.: US 12,405,473 B2
(45) Date of Patent: Sep. 2, 2025

(54) OPTICAL SYSTEMS WITH REFLECTIVE PRISM INPUT COUPLERS

(71) Applicant: Apple Inc., Cupertino, CA (US)

(72) Inventors: Vikrant Bhakta, Santa Clara, CA (US); Guolin Peng, Sunnyvale, CA (US); Hyungryul Choi, San Jose, CA (US); Kevin A. Keilbach, Boulder, CO (US); Scott M. DeLapp, San Diego, CA (US)

( * ) Notice: Subject to any disclaimer, the term of this patent is extended or adjusted under 35 U.S.C. 154(b) by 0 days.

(21) Appl. No.: 18/641,244

(22) Filed: Apr. 19, 2024

(65) Prior Publication Data
US 2024/0272438 A1    Aug. 15, 2024

Related U.S. Application Data

(63) Continuation of application No. 17/477,321, filed on Sep. 16, 2021, now Pat. No. 11,994,681, which is a continuation of application No. PCT/US2020/050709, filed on Sep. 14, 2020.

(60) Provisional application No. 62/902,645, filed on Sep. 19, 2019.

(51) Int. Cl.
*G02B 6/00* (2006.01)
*F21V 8/00* (2006.01)
*G02B 27/01* (2006.01)

(52) U.S. Cl.
CPC ....... *G02B 27/0172* (2013.01); *G02B 6/0016* (2013.01); *G02B 6/003* (2013.01); *G02B 2027/0123* (2013.01); *G02B 2027/0147* (2013.01); *G02B 2027/0163* (2013.01)

(58) Field of Classification Search
CPC . G02B 27/0172; G02B 6/0018; G02B 6/0023
See application file for complete search history.

(56) References Cited

U.S. PATENT DOCUMENTS

| 4,405,941 A | 9/1983 | Mecklenborg |
| 6,646,809 B1 | 11/2003 | Ishino et al. |
| 7,418,170 B2 | 8/2008 | Mukawa et al. |

(Continued)

FOREIGN PATENT DOCUMENTS

| CN | 1539095 A | 10/2004 |
| CN | 102576153 A | 7/2012 |

(Continued)

*Primary Examiner* — Sanghyuk Park
(74) *Attorney, Agent, or Firm* — Treyz Law Group, P.C.; Michael H. Lyons; Jinie M. Guihan

(57) ABSTRACT

An electronic device may include a display module that generates light and an optical system that redirects the light towards an eye box. The system may include an input coupler on a waveguide and a lens that directs the light towards the input coupler. The input coupler may include a prism having a reflective surface that reflects the light into the waveguide. The reflective surface may be curved to provide the light with an optical power. The prism may be configured to expand a field of view of the light. A birefringent beam displacer may expand the effective pupil size of the light. The lens may include lens elements that converge the light at a location between the lens elements and the waveguide. A switchable panel may be placed at the location and toggled between first and second orientations to increase the effective resolution of the light.

20 Claims, 15 Drawing Sheets

(56) References Cited

U.S. PATENT DOCUMENTS

| | | |
|---|---|---|
| 7,502,168 B2 | 3/2009 | Akutsu et al. |
| 7,764,413 B2 | 7/2010 | Levola |
| 8,160,411 B2 | 4/2012 | Levola et al. |
| 8,233,204 B1 | 7/2012 | Robbins et al. |
| 8,446,675 B1 | 5/2013 | Wang et al. |
| 8,665,178 B1 | 3/2014 | Wang |
| 8,903,207 B1 | 12/2014 | Brown et al. |
| 9,075,184 B2 | 7/2015 | Popovich et al. |
| 9,341,846 B2 | 5/2016 | Popovich et al. |
| 9,456,744 B2 | 10/2016 | Popovich et al. |
| 11,119,261 B1 | 9/2021 | Ayres et al. |
| 11,947,110 B2 | 4/2024 | Pfeiffer et al. |
| 2002/0021498 A1 | 2/2002 | Ohtaka et al. |
| 2004/0227923 A1 | 11/2004 | Flagello et al. |
| 2006/0268421 A1 | 11/2006 | Shimizu et al. |
| 2013/0250430 A1 | 9/2013 | Robbins et al. |
| 2014/0140653 A1 | 5/2014 | Brown et al. |
| 2014/0140654 A1 | 5/2014 | Brown et al. |
| 2014/0240843 A1 | 8/2014 | Kollin |
| 2015/0219898 A1* | 8/2015 | Ko .................. G02B 27/0172 359/630 |
| 2015/0260992 A1 | 9/2015 | Luttmann et al. |
| 2016/0041387 A1 | 2/2016 | Valera et al. |
| 2016/0154150 A1 | 6/2016 | Simmonds et al. |
| 2017/0031160 A1 | 2/2017 | Popovich et al. |
| 2017/0276940 A1 | 9/2017 | Popovich et al. |
| 2019/0094981 A1 | 3/2019 | Bradski et al. |
| 2019/0113829 A1 | 4/2019 | Waldern et al. |
| 2019/0391408 A1 | 12/2019 | Mansharof |
| 2020/0103660 A1 | 4/2020 | Mukawa |
| 2021/0072553 A1 | 3/2021 | Danziger et al. |

FOREIGN PATENT DOCUMENTS

| | | |
|---|---|---|
| CN | 106716223 A | 5/2017 |
| CN | 107272198 A | 10/2017 |
| CN | 108693641 A | 10/2018 |
| CN | 108700697 A | 10/2018 |
| CN | 108873332 A | 11/2018 |
| JP | H07270791 A | 10/1995 |
| JP | H09230320 A | 9/1997 |
| JP | H11039706 A | 2/1999 |
| JP | 2005062297 A | 3/2005 |
| JP | 2005189677 A | 7/2005 |
| JP | 2006126238 A | 5/2006 |
| JP | 2007011279 A | 1/2007 |
| JP | 2007052086 A | 3/2007 |
| JP | 2017520013 A | 7/2017 |
| WO | 2014155096 A1 | 10/2014 |
| WO | 2015162611 A1 | 10/2015 |
| WO | 2017077934 A1 | 5/2017 |
| WO | 2017176389 A | 10/2017 |
| WO | 2017176393 A1 | 10/2017 |

* cited by examiner

US 12,405,473 B2

OPTICAL SYSTEMS WITH REFLECTIVE PRISM INPUT COUPLERS

This application is a continuation of U.S. non-provisional patent application No. 17/477,321, filed Sep. 16, 2021, which is a continuation of international patent application No. PCT/US2020/050709, filed Sep. 14, 2020, which claims the benefit of U.S. provisional patent application No. 62/902,645, filed Sep. 19, 2019, which are hereby incorporated by reference herein in their entireties.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates light and an optical system that redirects the light from the display module towards an eye box. The optical system may include an input coupler and an output coupler formed on a waveguide. The input coupler may redirect light from the display module so that the light propagates in the waveguide towards the output coupler. The output coupler may couple the light out of the waveguide and towards the eye box. The output coupler may include diffractive grating structures such as volume holograms in the waveguide.

The input coupler may be a reflective input coupling prism mounted to the waveguide. A lens may direct the light from the display module to the input coupler through the waveguide. The prism may receive the light from the lens through the waveguide and may have a reflective surface that reflects the light into the waveguide. The reflective surface may be curved to provide the reflected light with an optical power. This may allow the lens to have fewer lens elements than in scenarios where the prism does not impart optical power on the light.

The prism may be configured to expand a field of view of the light. For example, a switchable reflective layer may be provided on the reflective surface for expanding a field of view of the light. If desired, the prism may be a split prism that includes a first wedge having a first reflective surface and a second wedge mounted to the first reflective surface. The first reflective surface may reflect the image light in a first direction whereas the second reflective surface reflects the image light in a second direction. A polarization-sensitive film may be provided on the first reflective surface and may reflect a first polarization of light while transmitting a second polarization of light. A switchable polarizer may be used to sequentially provide the prism with light of the first and second polarizations. In another suitable arrangement, the display panel may concurrently provide the prism with light of the first and second polarizations. If desired, a switchable reflective layer may be provided on the first reflective surface and may selectively reflect or pass the light from the display module. If desired, a birefringent beam displacer may be interposed on the optical path of the display for expanding the effective pupil size of the light.

The lens may include a first set of lens elements that converge the light from the display module at a location between the first set of lens elements and the waveguide. A transparent panel that is switchable between first and second orientations may be placed at the location. The transparent panel may be toggled between the first and second orientations to increase the effective resolution of the light. If desired, a second set of lens elements may be interposed between the location and the waveguide.

DETAILED DESCRIPTION

Figure 1:
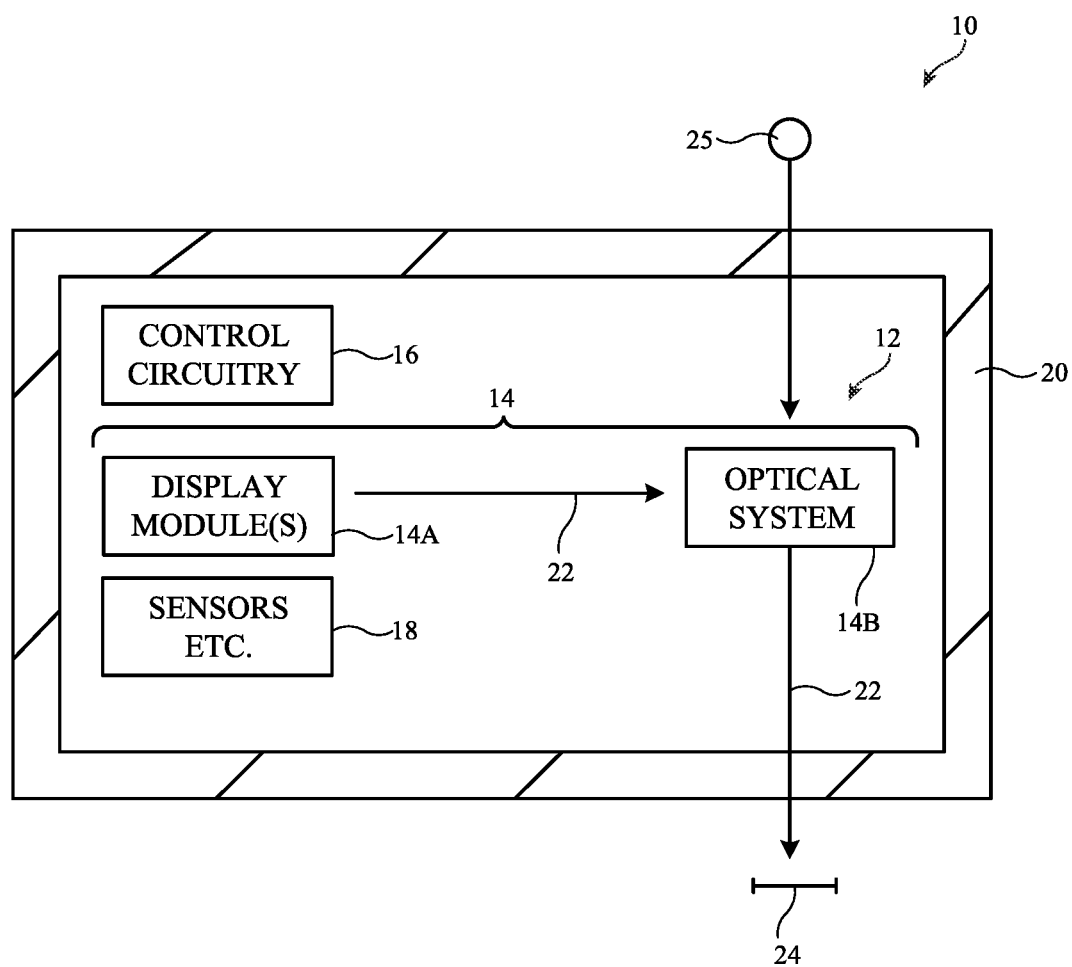
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 14A may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
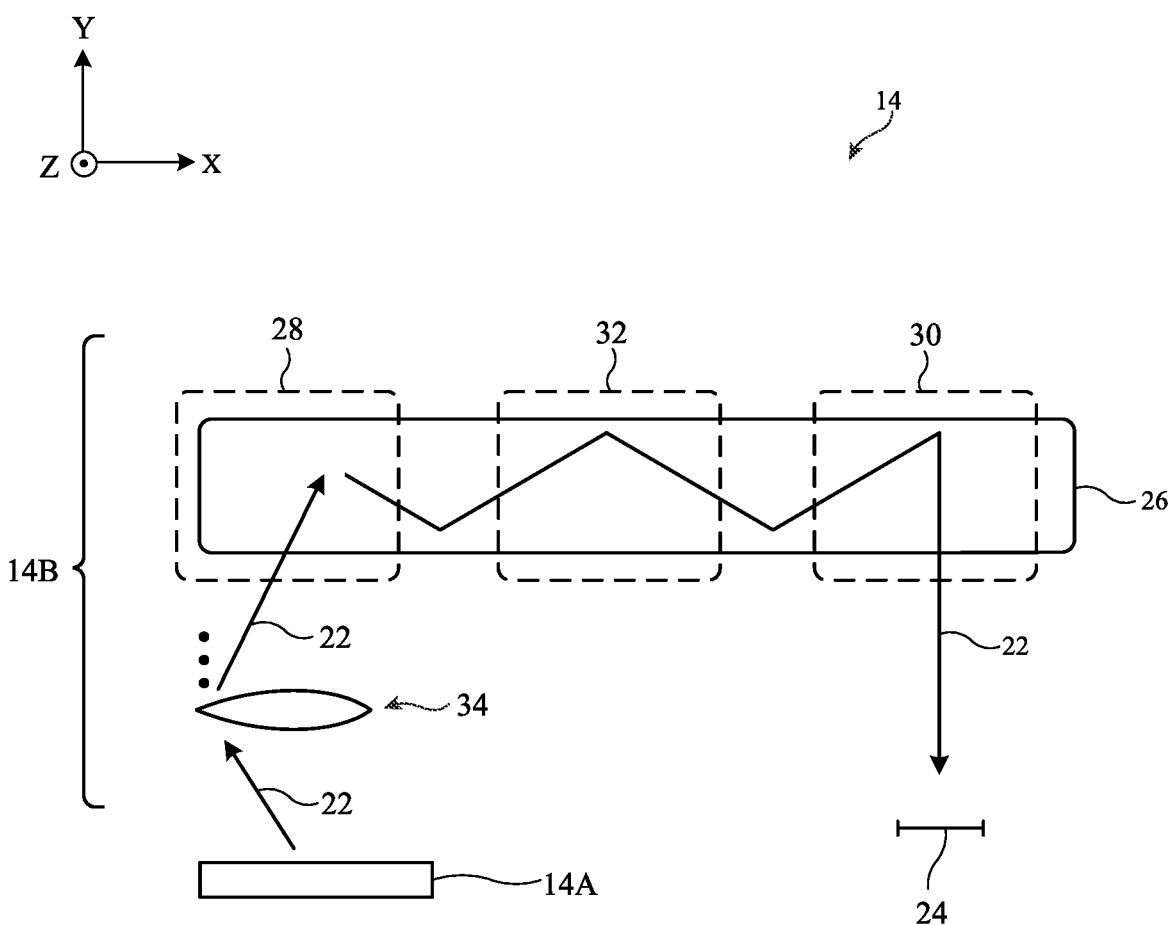
FIG. 2 is a top view of an illustrative optical system for a display having a waveguide with an input coupler in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate light 22 associated with image content to be displayed to eye box 24. Light 22 may be collimated using a lens such as collimating lens 34. Optical system 14B may be used to present light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide light 22 down its length via total internal reflection. Input coupler 28 may be configured to couple light 22 from display module 14A (lens 34) into waveguide 26, whereas output coupler 30 may be configured to couple light 22 from within waveguide 26 to the exterior of waveguide 26 and towards eye box 24. For example, display module 14A may emit light 22 in direction +Y towards optical system 14B. When light 22 strikes input coupler 28, input coupler 28 may redirect light 22 so that the light propagates within waveguide 26 via total internal reflection towards output coupler 30 (e.g., in direction X). When light 22 strikes output coupler 30, output coupler 30 may redirect light 22 out of waveguide 26 towards eye box 24 (e.g., back along the Y-axis). In scenarios where cross-coupler 32 is formed at waveguide 26, cross-coupler 32 may redirect light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 is formed from a reflective prism mounted to an exterior surface of waveguide 26 (e.g., an exterior surface defined by a waveguide substrate that contacts the grating medium or the polymer layer used to form output coupler 30).

Figure 3:
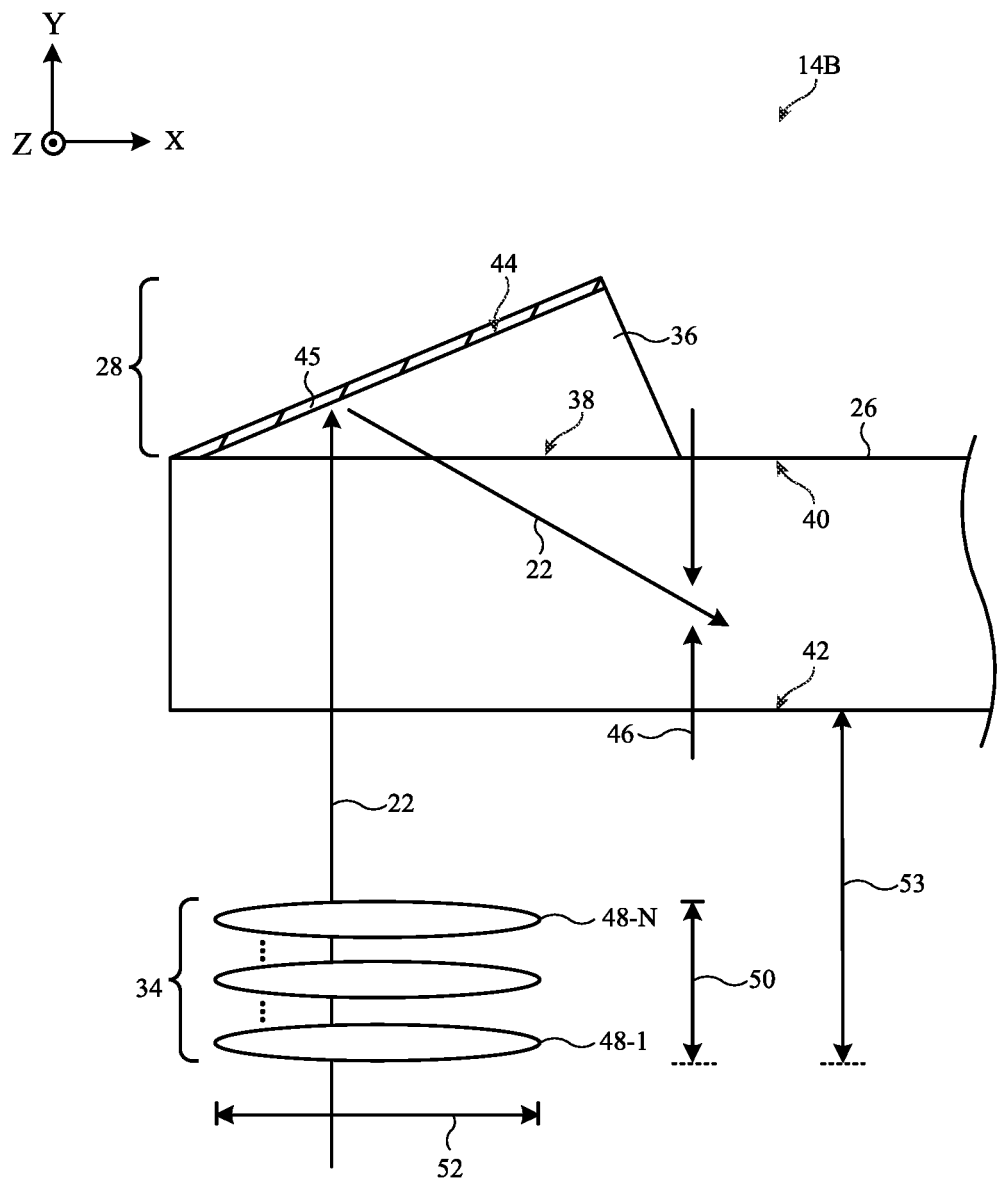
FIG. 3 is a top view of an illustrative input coupler formed from a reflective prism in accordance with some embodiments.

FIG. 3 is a top view showing how input coupler 28 at waveguide 26 may be formed from a reflective prism. As shown in FIG. 3, input coupler 28 may include a reflective prism (e.g., a reflective input coupling prism) such as prism 36. Prism 36 may have a bottom surface 38 mounted to exterior surface 40 of waveguide 26 (e.g., using an optically clear adhesive not shown in FIG. 3 for the sake of clarity).

As shown in FIG. 3, lens 34 may receive light 22 (e.g., from display module 14A of FIG. 2). Prism 36 may be mounted to the side of waveguide 26 opposite to lens 34 and display module 14A. For example, waveguide 26 may have an exterior surface 42 that opposes exterior surface 40. Exterior surface 42 may be interposed between prism 36 and lens 34 (e.g., waveguide 26 may be interposed between prism 36 and display module 14A).

Lens 34 may direct light 22 towards waveguide 26. Light 22 may enter waveguide 26 through surface 42 (e.g., at a sufficiently low angle with respect to the normal surface of surface 42 such that no total internal reflection occurs). Light 22 may pass through surface 40 of waveguide 26 into prism 36. Light 22 may reflect off of surface 44 of prism 36 (sometimes referred to herein as reflective surface 44 or reflection surface 44) and back into waveguide 26 through surfaces 38 and 40. Surface 44 may be tilted in one or more directions (e.g., including out of the plane of the page, where the normal axis of surface 44 is oriented at a non-zero angle with respect to the +Y axis within the Z-Y plane in addition to a non-zero angle with respect to the +Y axis within the X-Y plane). Light 22 may then propagate down the length of waveguide 26 via total internal reflection. In this way, prism 36 may couple light 22 into waveguide 26 despite being located on the side of waveguide 26 opposite to lens 34 and display module 14A (FIG. 2).

The angular spread of light 22 may be confined to pupil 46 within waveguide 26 after being coupled into waveguide 26 by prism 36 (e.g., the rays of light reflected by prism 36 may converge at pupil 46 within waveguide 26). The optical path length from surface 42 to surface 38, from surface 38 to surface 44, and to pupil 46 from surface 44 may, for example, be substantially greater (e.g., two times greater or more than two times greater) than the optical path length from lens 34 to the point within the waveguide where the rays of light from the prism converge in scenarios where input coupler 28 is formed from a transmissive input coupling prism mounted to surface 42 of waveguide 26. This may serve to optimize the optical performance of optical system 14B while minimizing the distance 53 from the input of lens 34 to surface 42 (e.g., thereby allowing optical system 14B to occupy less space and to better fit within the form factor of a head mounted support structure such as support structure 20 of FIG. 1) relative to scenarios where a transmissive input coupling prism is used.

Lens 34 may be formed from one or more lens elements 48 (e.g., a first lens element 48-1, an Nth lens element 48-N, etc.). Lens elements 48 may include any desired lens elements (e.g., lenses with concave surfaces, convex surfaces, planar surfaces, spherical surfaces, aspherical surfaces, and/or free-form curved surfaces, lenses with microstructures, Fresnel lenses, combinations of these and/or other types of lens elements, etc.). Lens 34 may have a width 52 and a length 50.

If desired, an optional reflective layer such as reflective layer 45 may be layered onto surface 44 of prism 36. Reflective layer 45 may include a reflective dielectric coating, a reflective metallic coating, patterns of three-dimensional metal structures, and/or a layer of (reflective) diffraction gratings such as one or more thin-film or volume holograms in a grating medium or surface relief gratings layered onto surface 44. Reflective layer 45 may, for example, help to increase the amount of light 22 that is reflected off of surface 44. If desired, reflective layer 45 may also be configured to provide light 22 with an optical power upon reflecting off of reflective layer 45 at surface 44 of prism 36. For example, diffractive gratings in reflective layer 45 may diffract light 22 back towards waveguide 26 while also imparting optical power onto the diffracted light. Reflective layer 45 may be omitted if desired.

Figure 4:
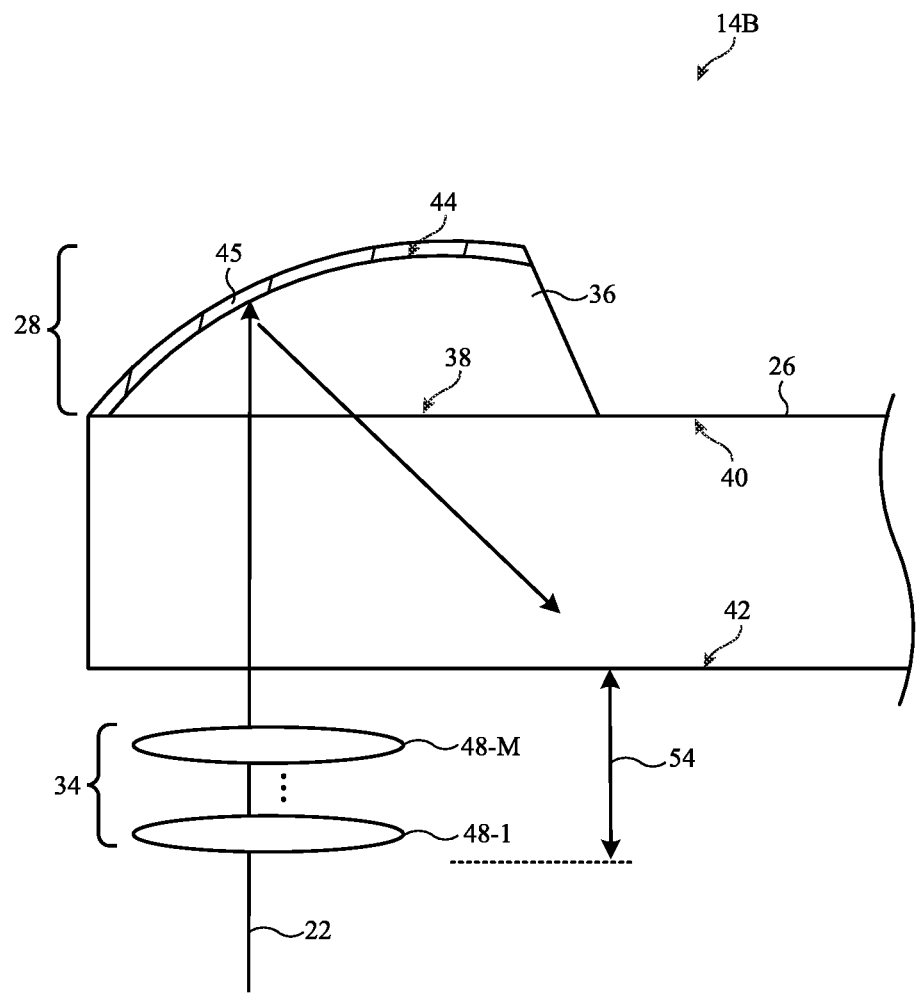
FIG. 4 is a top view of an illustrative input coupler formed from a reflective prism having a curved reflective surface in accordance with some embodiments.

In the example of FIG. 3, surface 44 of prism 36 is planar. This example is merely illustrative. If desired, surface 44 may be curved. FIG. 4 is a top view showing how surface 44 of prism 36 may be curved. As shown in FIG. 4, the curved shape of surface 44 may impart light 22 with optical power upon reflection off of surface 44. Surface 44 may have a spherically-curved shape, an aspherically-curved shape, or a free-form curved shape following any desired curved three-dimensional surface. Reflective layer 45 on the curved surface 44 of FIG. 4 may help to increase the amount of light 22 that is reflected off of surface 44 and/or may help contribute to the optical power of the light 22 reflected into waveguide 26. Reflective layer 45 may be omitted if desired.

In the example of FIG. 4, lens 34 includes M lens elements 48 (e.g., a first lens element 48-1, an Mth lens element 48-M, etc.). The number M of lens elements 48 in lens 34 in the example of FIG. 4 may be less than the number N of lens elements 48 in lens 34 in the example of FIG. 3. The optical power imparted by curved surface 44 and/or reflective layer 45 may, for example, contribute the optical power to light 22 that would otherwise have been provided by the N-M extra lenses in lens 34 of FIG. 3. This may allow the input of lens 34 to be separated from surface 42 of waveguide 26 by a distance 54 that is shorter than distance 53 of FIG. 3. This may serve to further reduce the amount of space occupied by optical system 14B in system 10 (FIG. 1), for example.

In the example of FIGS. 3 and 4, light 22 may be confined to a relatively small pupil within waveguide 26 (e.g., pupil 46 of FIG. 3). In practice, it may be desirable for optical system 14B to fill as large of an eye box 24 with as uniform an intensity of light 22 as possible. If desired, light redirecting elements such as input coupler 28 may be configured to expand light 22 in one or more dimensions while also coupling light 22 into waveguide 26, to fill as large of an eye box 24 with as uniform an intensity of light 22 as possible.

Figure 5:
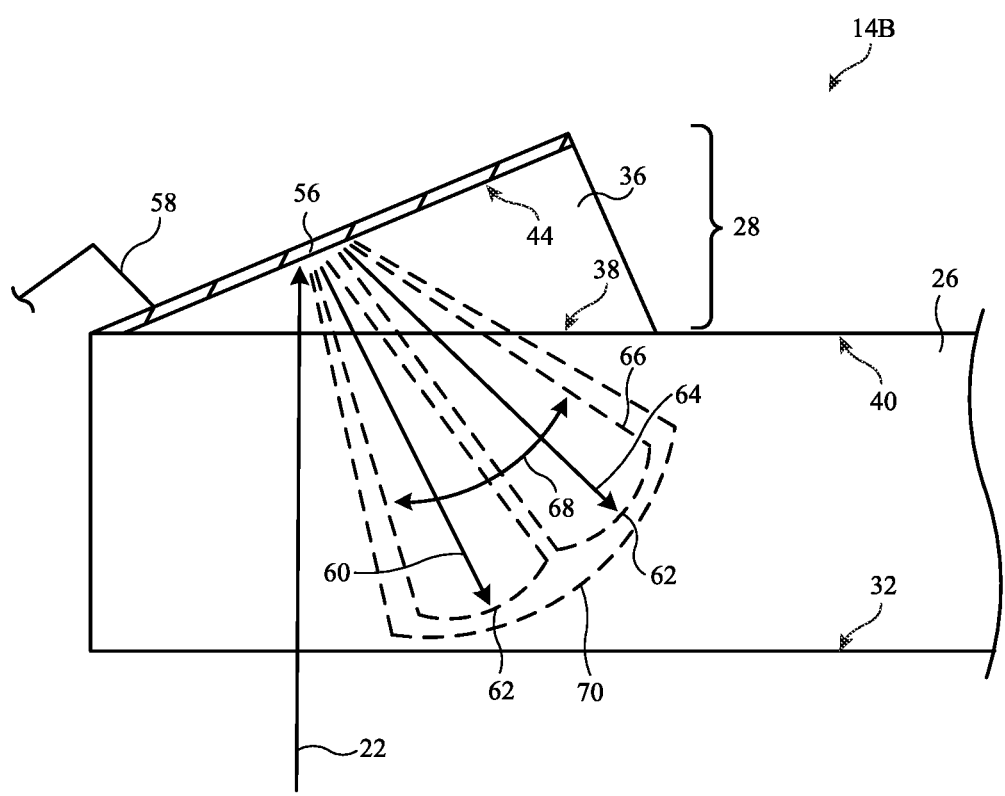
FIG. 5 is a top view of an illustrative input coupler formed from a reflective prism having a switchable reflective component for expanding the field of view for a display in accordance with some embodiments.

FIG. 5 shows an example in which prism 36 includes a switchable reflective surface for expanding the field of view of light 22. As shown in FIG. 5, a switchable reflective layer such as switchable reflective layer 56 may be layered onto surface 44 of prism 36. Switchable reflective layer 56 may include, for example, a liquid crystal (LC) grating, a digital micromirror device (DMD), or other microelectromechanical (MEMs) structures that are switchable between at least first and second states. Switchable reflective layer 56 may receive control signals over control path 58 (e.g., from control circuitry 16 of FIG. 1) that place switchable reflective layer 56 into a selected one of the first and second states at any given time.

In the first state, image light 22 may reflect off of surface 44 and switchable reflective layer 56 (sometimes referred to herein collectively as a switchable reflective surface) in a first direction into waveguide 26, as shown by arrow (ray) 60. This reflected light may exhibit a relatively-small field of view 62. In the second state, image light 22 may reflect off of surface 44 and switchable reflective layer 56 in a second direction into waveguide 26, as shown by arrow 64. This reflected light may exhibit a relatively-small field of view 66.

The control circuitry may rapidly toggle switchable reflective layer 56 between the first and second states, as shown by arrow 68, so that the light 22 coupled into waveguide 26 exhibits a relatively wide effective field of view 70. Switchable reflective layer 56 may be switched between the first and second states at a speed greater than the response speed of the human eye (e.g., greater than 60 Hz, greater than 120 Hz, greater than 240 Hz, greater than 1 kHz, greater than 10 kHz, etc.) so that a user at eye box 24 (FIG. 2) is unable to separately perceive each state and instead perceives a single effective field of view 70. In this way, image light 22 may be coupled into waveguide 26 and provided to the eye box with a wider effective field of view than would otherwise be provided to the eye box. As an example, fields of view 62 and 66 may each be 30 degrees, 25 degrees, between 25 and 35 degrees, less than 45 degrees, etc., whereas field of view 70 is 60 degrees, between 55 and 65 degrees, greater than 45 degrees, or any other desired angle greater than field of view 62 or field of view 66.

Figure 6:
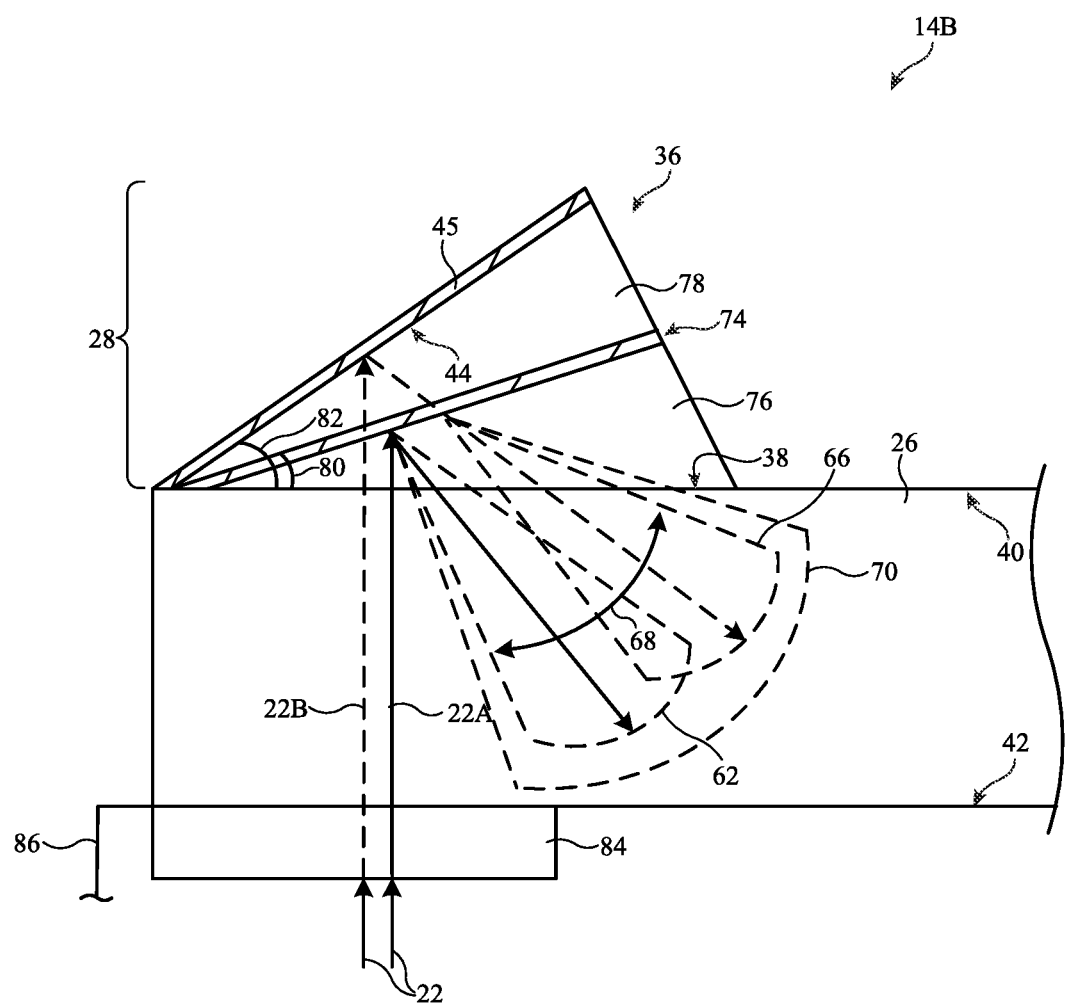
FIG. 6 is a top view of an illustrative input coupler formed from a split reflective prism having a polarization-sensitive reflective film for expanding a field of view in accordance with some embodiments.

FIG. 6 shows another example in which prism 36 expands the field of view of light 22. As shown in FIG. 6, prism 36 may be a split prism having a first portion 76 and a second portion 78 stacked on upper surface 72 of first portion 76. Upper surface 72 may be planar, may be tilted in one or more directions (e.g., including out of the plane of the page), or may be curved (e.g., free-form curved). Portions 78 and 76 may be formed from the same material (e.g., may have the same index of refraction) or may be formed from different materials (e.g., materials having different indices of refraction).

Portion 76 may have a wedge shape and may therefore sometimes be referred to herein as wedge 76. Portion 78 may have a wedge shape and may therefore sometimes be referred to herein as wedge 78. This is merely illustrative and, in general, portions 76 and 78 may have any desired shapes. Wedge 76 may include bottom surface 38 of prism 36 and may be mounted to surface 40 of waveguide 26. Upper surface 72 of wedge 76 may be oriented at an acute angle such as angle 80 with respect to surface 38 (e.g., surfaces 38, 40, and/or 42 may be planar). Wedge 78 may include the reflective surface 44 of prism 36. Surface 44 may be oriented at an acute angle such as angle 82 with respect to surface 80 (e.g., angle 82 may be greater than angle 80).

Prism 36 may include a passive partially reflective layer such as polarization-sensitive reflective film 74. Polarization-sensitive reflective film 74 (sometimes referred to herein as polarizing beam splitter 74 or reflective film 74) may be layered onto upper surface 72 of wedge 76 (e.g., wedge 78 may be mounted to reflective film 74). Reflective film 74 may reflect light of a first polarization and may pass (transmit) light of a second polarization without reflecting the light of the second polarization. The first polarization may be a p-polarization whereas the second polarization is an s-polarization or the first polarization may be an s-polarization whereas the second polarization is a p-polarization, as an example. If desired, optically clear adhesive (not shown in FIG. 6 for the sake of clarity) may be used to help adhere wedge 78 to wedge 76. Reflective film 74 may be formed from a wire grid polarizer, if desired.

In this example, optical system 14B may also include a switchable polarizer such as switchable polarizer 84. Waveguide 26 may be interposed between switchable polarizer 84 and prism 36. Switchable polarizer 84 may be mounted to surface 42 of waveguide 26 (e.g., using an optically clear adhesive not shown in FIG. 6 for the sake of clarity) or may be spaced apart from surface 42. One or more lens elements (e.g., from lens 34 of FIG. 2) may be interposed between switchable polarizer 84 and waveguide 26. In another suitable arrangement, display module 14A may include a spatial light modulator such as a reflective display panel (e.g., a DMD or LCOS display panel) or a transmissive display panel that receives illumination light from one or more light sources. In this example, switchable polarizer 84 may, if desired, be optically coupled between the light sources and the spatial light modulator.

Switchable polarizer 84 may receive light 22. Switchable polarizer 84 may have a first state at which switchable polarizer 84 only passes (transmits) light 22A of the first polarization and a second state at which switchable polarizer 84 only passes (transmits) light 22B of the second polarization. When switchable polarizer 84 is in the first state, light 22A of the first polarization passes through wedge 76 and reflects off of reflective film 72 to produce field of view 62 within waveguide 26. When switchable polarizer 84 is in the second state, light 22B of the second polarization passes through wedge 76 and reflective film 74 (e.g., without being reflected by reflective film 74). Light 22B then passes through wedge 78 and is reflected off of surface 44 of wedge 78 to produce field of view 66 within waveguide 26. If desired, reflective layer 45 may be formed on surface 44 to help increase the reflected intensity and/or to provide optical power to light 22B. Surface 44 and/or surface 72 (e.g., reflective film 74) may be curved if desired (e.g., to provide light 22A and 22B with optical power). Reflective layer 45 may be omitted if desired.

Switchable polarizer 84 may receive control signals over control path 86 (e.g., from control circuitry 16 of FIG. 1) that place switchable polarizer 84 into a selected one of the first and second states at any given time. The control circuitry may rapidly toggle switchable polarizer 84 between the first and second states, as shown by arrow 68, so that light 22 (e.g., light 22A and 22B) is coupled into waveguide 26 and exhibits the relatively wide effective field of view 70. Switchable polarizer 84 may be switched between the first and second states at a speed greater than the response speed of the human eye (e.g., greater than 60 Hz, greater than 120 Hz, greater than 240 Hz, greater than 1 kHz, greater than 10 kHz, etc.) so that a user at eye box 24 (FIG. 1) is unable to perceive each state and instead perceives a single effective field of view 70. In this way, image light 22 may be coupled into waveguide 26 and provided to the eye box with a wider effective field of view than would otherwise be provided to the eye box. In another suitable arrangement, rapidly toggling between light 22A and 22B may be used to increase the effective resolution of the images provided at the eye box (e.g., where the light reflected by surfaces 72 and 44 is angularly separated by about one-half of the pixel pitch of the image data to be displayed, thereby doubling the effective resolution of the images provided to the eye box). The methods and systems for increasing field of view as described in connection with any of the embodiments herein may additionally or alternatively be used to increase the effective resolution of the images provided at the eye box in this way (e.g., the arrangement of FIG. 5 may also be used to produce an image having an increased effective resolution at the eye box rather than to expand the field of view of the light at the eye box).

Figure 7:
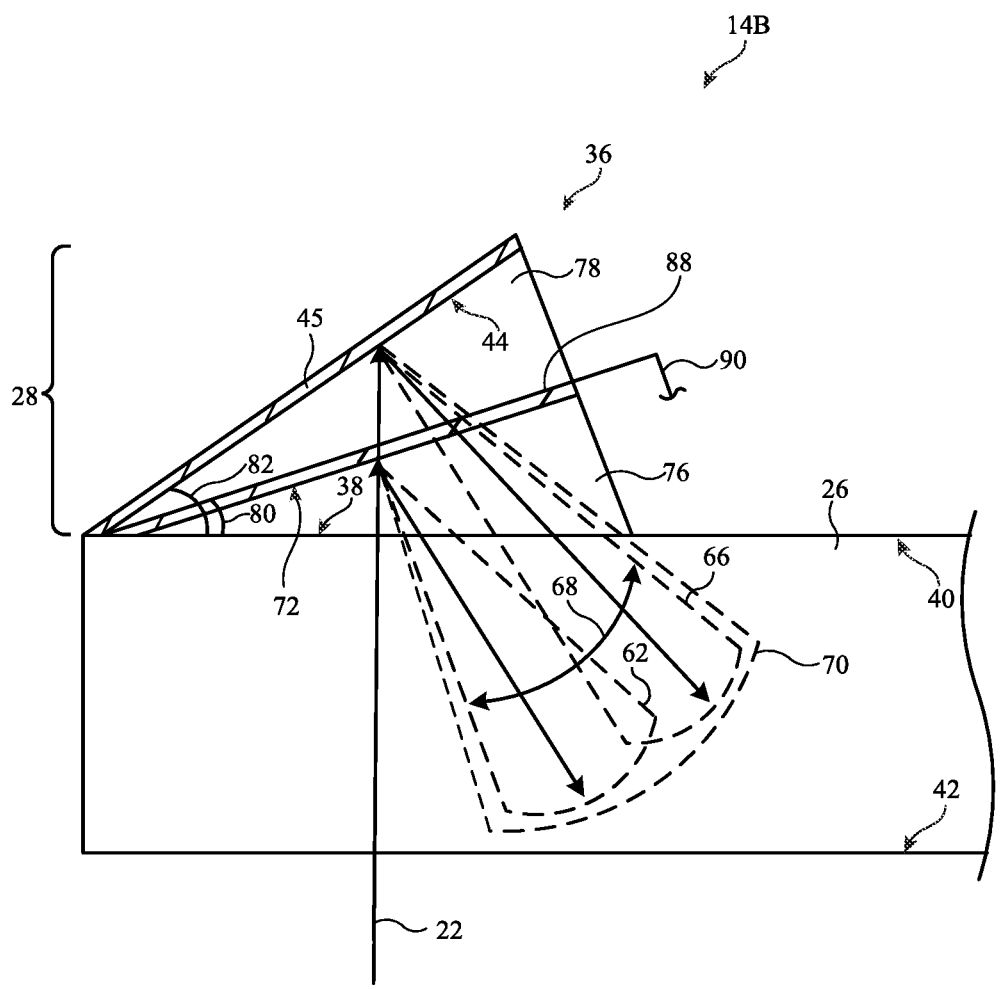
FIG. 7 is a top view of an illustrative input coupler formed from a split reflective prism having a switchable reflective component for expanding a field of view in accordance with some embodiments.

FIG. 7 shows another example in which prism 36 expands the field of view of light 22. As shown in FIG. 7, prism 36 may include a switchable reflective layer such as switchable reflective layer 88 interposed between wedges 76 and 78. Switchable reflective layer 88 may include a cholesteric liquid crystal reflector or any other desired switchable reflective (mirror) layered onto surface 72 of wedge 76 (e.g., wedge 78 may be mounted to switchable reflective layer 88).

Switchable reflective layer 88 may receive light 22 through waveguide 26 and wedge 76. Switchable reflective layer 88 may have a first state at which switchable reflective layer 88 reflects light 22 and a second state at which switchable reflective layer 88 only passes (transmits) light 22 without reflecting light 22. When switchable reflective layer 88 is in the first state, light 22 passes through wedge 76 and reflects off of switchable reflective layer 88 to produce field of view 62 within waveguide 26. When switchable reflective layer 88 is in the second state, light 22 passes through wedge 76 and switchable reflective layer 88 (e.g., without being reflected by switchable reflective layer 88). Light 22 then passes through wedge 78 and is reflected off of surface 44 of wedge 78 to produce field of view 66 within waveguide 26. If desired, reflective layer 45 may be formed on surface 44 to help increase the reflected intensity and/or to provide optical power to light 22. Surface 44 and/or surface 72 (e.g., switchable reflective layer 88) may be curved if desired (e.g., to provide light 22 with optical power). Reflective layer 45 may be omitted if desired.

Switchable reflective layer 88 may receive control signals over control path 90 (e.g., from control circuitry 16 of FIG. 1) that place switchable reflective layer 88 into a selected one of the first and second states at any given time. The control circuitry may rapidly toggle switchable reflective layer 88 between the first and second states, as shown by arrow 68, so that light 22 is coupled into waveguide 26 and exhibits the relatively wide effective field of view 70. Switchable reflective layer 88 may be switched between the first and second states at a speed greater than the response speed of the human eye (e.g., greater than 60 Hz, greater than 120 Hz, greater than 240 Hz, greater than 1 kHz, greater than 10 kHz, etc.) so that a user at eye box 24 (FIG. 1) is unable to perceive each state and instead perceives a single effective field of view 70. In this way, image light 22 may be coupled into waveguide 26 and provided to the eye box with a wider effective field of view than would otherwise be provided to the eye box. Because switchable reflective layer 88 is insensitive to the polarization of light 22, prism 36 of FIG. 7 may expand the field of view of light 22 without requiring other components that polarize light 22.

In the example of FIGS. 6 and 7, light 22 is expanded by toggling a switchable element faster than the response speed of the human eye (e.g., because image light is only provided within one of fields of view 62 or 66 at any given time). To accommodate this switching, display module 14A needs to produce frames of image data in light 22 at the same relatively high speed, so that a full stream of image data is provided to a user at the eye box. In practice, this can consume an undesirably high amount of processing resources and power within system 10.

In another suitable arrangement, light 22 may be concurrently provided within both fields of view 62 and 66 in waveguide 26. This may allow the field of view of light 22 to be expanded without rapidly toggling a switchable element and without requiring the display module to display image data at a corresponding high speed. This may serve to minimize the amount of processing resources and power consumed by system 10 while still expanding the field of view of light 22 provided to the eye box. In another suitable arrangement, the structures of FIG. 7 may be used to produce an image having an increased effective resolution at the eye box rather than to expand the field of view of the light at the eye box).

Figure 8:
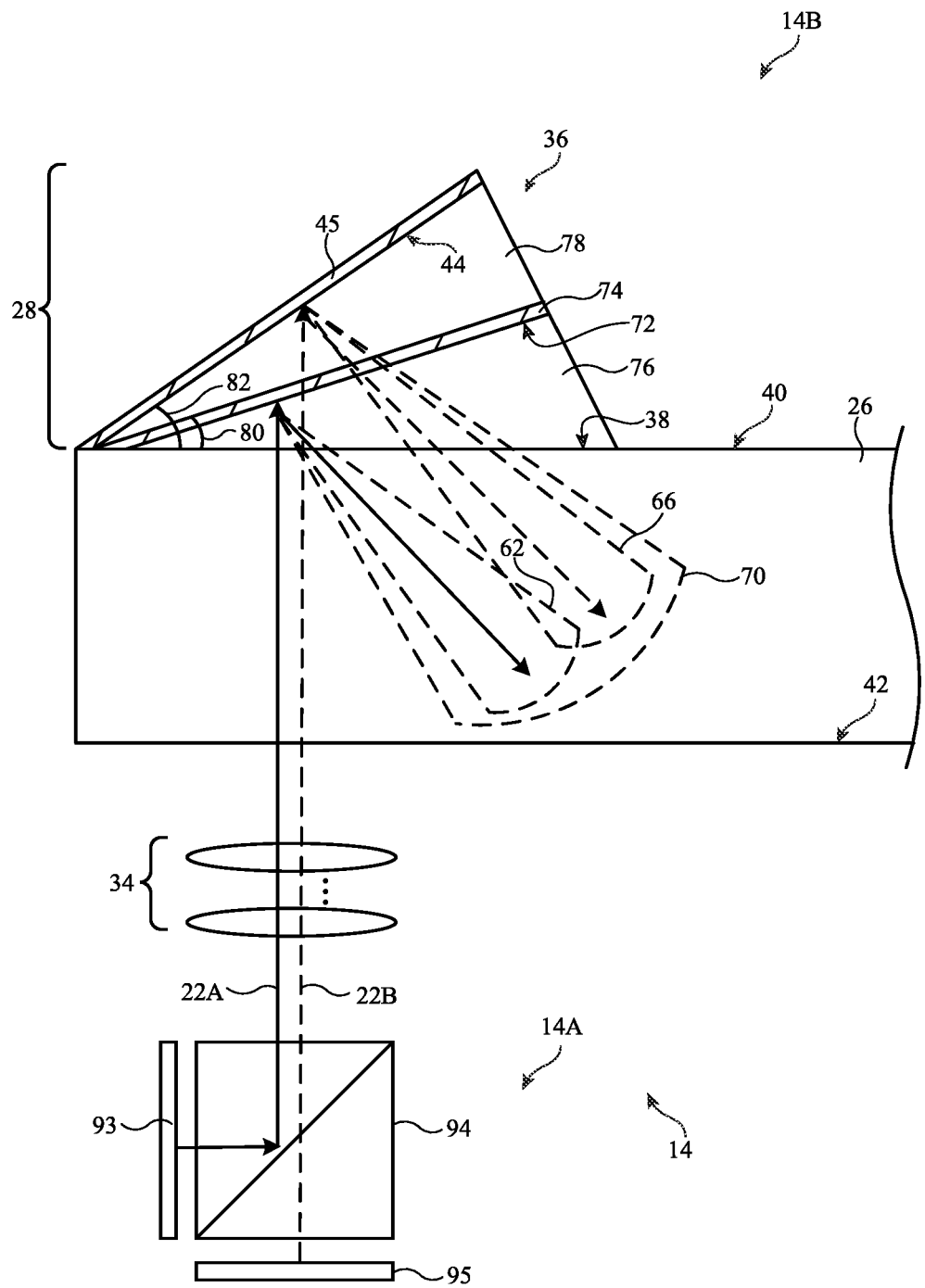
FIG. 8 is a top view of an illustrative display system in which light of different polarizations is concurrently provided to a split reflective prism having a polarization-sensitive reflective film for expanding a field of view in accordance with some embodiments.

FIG. 8 is a diagram showing how light 22 may be concurrently provided within both fields of view 62 and 66 in waveguide 26. As shown in FIG. 8, display module 14A may include at least a first display panel 93 and a second display panel 95. Display module 14A may also include a prism such as prism 94. Display panels 93 and 95 may be, for example, uLED panels or other emissive displays. Collimating optics, polarizers, and/or any other desired optical components may be interposed between display panel 93 and prism 94 and between display panel 95 and prism 94. Display panels 93 and 95 may include reflective spatial light modulators (e.g., DMD panels, LCOS panels, etc.) in another suitable arrangement.

Display panel 93 may emit light 22A of the first polarization whereas display panel 95 emits light 22B of the second polarization. Prism 94 may include a polarizing beam splitter that reflects light 22A of the first polarization towards lens 34 and input coupler 28 and that transmits light 22B of the second polarization towards lens 34 and input coupler 28. Reflective film 74 on wedge 76 may reflect light 22A to produce field of view 62 within waveguide 26. At the same time, reflective film 74 may transmit light 22B, which reflects off of surface 44 to produce field of view 66 within waveguide 26. Display panels 93 and 95 may be active at the same time to concurrently provide light 22A and 22B to input coupler 28. This may allow prism 36 to concurrently produce fields of view 62 and 66, so that the in-coupled light collectively exhibits the wide effective field of view 70 within waveguide 26.

The pupils of light 22 within waveguide 26 (e.g., pupil 46 of FIG. 3) may be replicated during propagation down the length of waveguide 26 to fill the eye box with light. In practice, there may be gaps between the replicated pupils that produce uneven brightness uniformity across the area of the eye box. In some scenarios, increasing the size of display module 14A may help to fill the gaps between the replicated pupils so that the eye box is filled with light of uniform intensity. However, larger display modules 14A may occupy an excessive amount of space within system 10. If desired, the optical path of optical system 14B may include a birefringent beam displacer that helps to fill the gaps between the replicated pupils so that the eye box is filled with light of uniform intensity (e.g., without increasing the size of display module 14A). In another suitable arrangement, the structures of FIG. 8 may be used to produce an image having an increased effective resolution at the eye box.

Figure 9:
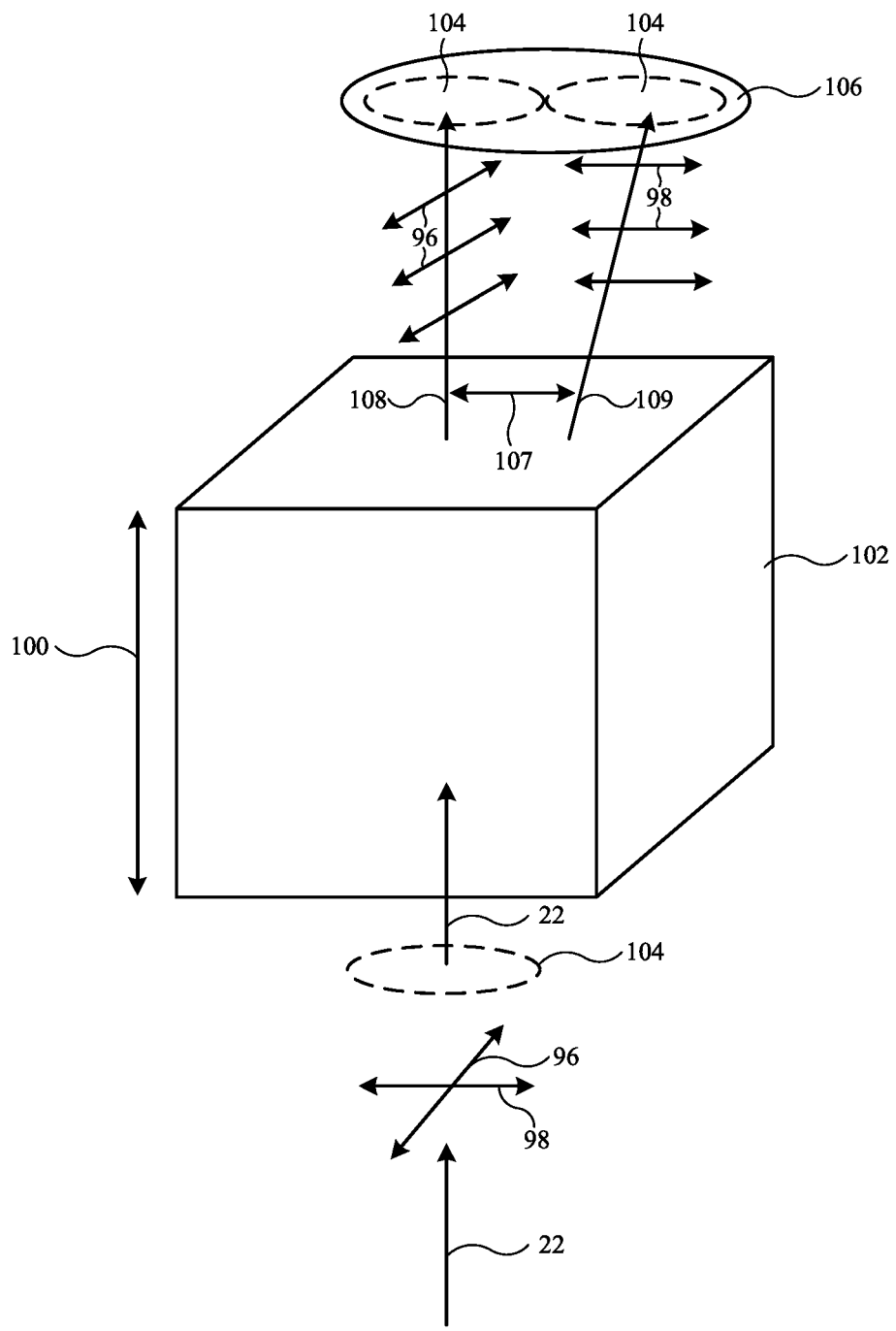
FIG. 9 is a perspective view of an illustrative birefringent beam displacer that may be provided on a waveguide for expanding a pupil of light within the waveguide in accordance with some embodiments.

FIG. 9 is a perspective view of an illustrative birefringent beam displacer 102 that may be provided in optical system 14B. As shown in FIG. 9, birefringent beam displacer 102 may be formed from a birefringent material such as calcite and may have a length 100 (e.g., in the direction of the optical path). Birefringent beam displacer 102 may receive light 22. Light 22 may include light of a first polarization 96 in alignment with light of a second polarization 98 (e.g., within a corresponding pupil 104 at the input face of birefringent beam displacer 102).

Birefringent beam displacer 102 may separate light 22 into a first beam 108 that includes the light of the first polarization 96 and a second beam 109 that includes the light of the second polarization 98. Upon exiting birefringent beam displacer 102, beam 109 may be separated from beam 108 by displacement 107. The magnitude of displacement 107 may be directly proportional to the length 100 of birefringent beam displacer 102, for example. Beams 108 and 109 may each individually exhibit relatively small pupils 104. However, displacement 107 may separate the pupils 104 of beams 108 and 109 so that beams 108 and 109 collectively exhibit an expanded pupil 106. Expanded pupil 106 may be replicated by waveguide 26. Because expanded pupil 106 is larger than pupil 104, expanded pupil 106 may fill the eye box with light of more uniform intensity relative to scenarios where the birefringent beam displacer is omitted, for example.

Figure 10:
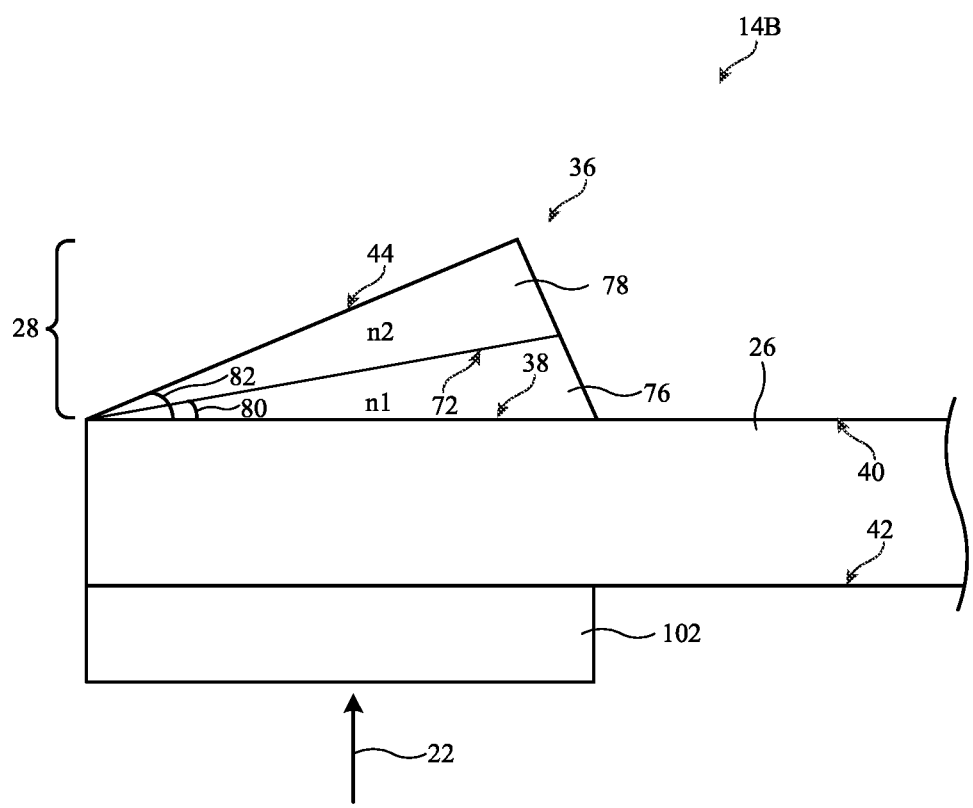
FIG. 10 is a top view showing how an illustrative birefringent beam displacer of the type shown in FIG. 9 may pass light to an input coupler having a split reflective prism in accordance with some embodiments.

FIG. 10 shows one example of how birefringent beam displacer 102 may be mounted within optical system 14B. As shown in FIG. 10, waveguide 26 may be interposed between prism 36 and birefringent beam displacer 102. Birefringent beam displacer 102 may be mounted to surface 42 (e.g., using optically clear adhesive not shown in FIG. 10 for the sake of clarity) or may be separated from waveguide 26.

Wedge 76 of prism 36 may, for example, be formed from a material having a first index of refraction $n_1$ whereas wedge 78 is formed from a material having a second index of refraction $n_2$. The difference in indices $n_1$ and $n_2$ may cause the light (e.g., after being split into displaced beams 108 and 109 of FIG. 9) to reflect off of surface 72 so that the light (e.g., expanded pupil 106 of FIG. 9) is coupled into waveguide 26. Partially or completely reflective layers may, if desired, be formed on any of the surfaces of prism 36 shown in FIG. 10, which may be planar and/or curved. In another suitable arrangement, birefringent beam displacer 102 may be used to form some or all of prism 36 (e.g., wedges 76 and/or 78). In another suitable arrangement, the structures of FIG. 10 may be used to produce an image having an increased effective resolution at the eye box.

In one suitable arrangement, lens 34 of FIGS. 2-4 may include a single set or grouping of lens elements (e.g., lens elements 48 of FIGS. 3 and 4) that direct light 22 towards waveguide 26 without converging the light at a point between two or more of the lens elements. This is merely illustrative. If desired, lens 34 may be provided with a relay optics arrangement in which lens 34 is formed from multiple groups or sets of lens elements that are separated by a gap, where the lens elements converge light 22 at a point between two or more of the lens elements.

Figure 11:
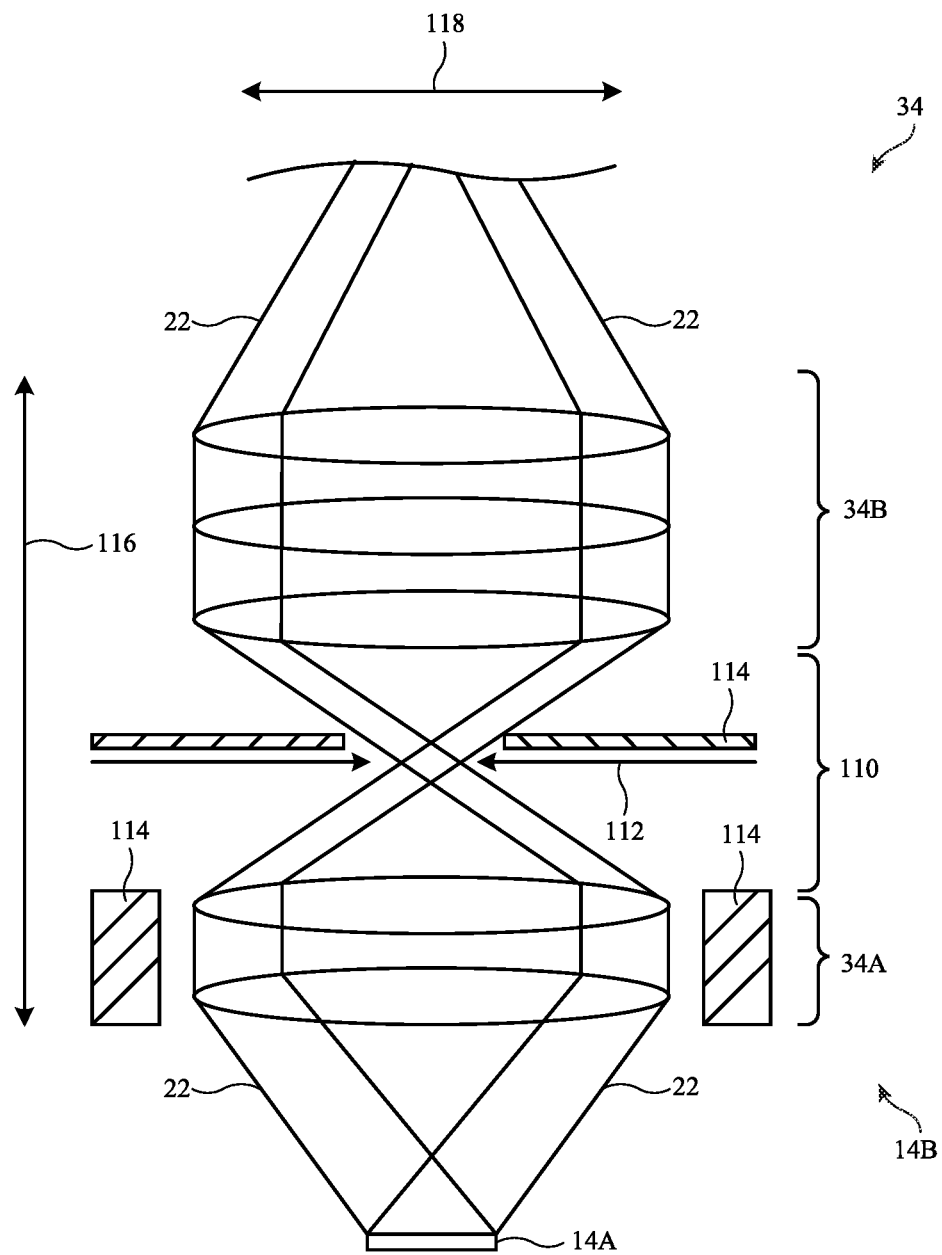
FIG. 11 is a top view of an illustrative split multi-element lens that may provide image light to an input coupler of the types shown in FIGS. 2-10 in accordance with some embodiments.

FIG. 11 is a diagram showing how lens 34 may include multiple groups or sets of lens elements that are separated by a gap, where the lens elements converge light 22 at a point between two or more of the lens elements. As shown in FIG. 11, lens 34 may include a first set (group) of lens elements 34A and a second set (group) of lens elements 34B (e.g., sets of lens elements such as lens elements 48 of FIGS. 3 and 4). Lens elements 34A and lens elements 34B may each include any desired number of lens elements (e.g., one lens element, two lens elements, three lens elements, four lens elements, more than four lens elements, etc.). Lens 34 may include the same number of lens elements 34A as lens elements 34B or may include a different number of lens elements 34A and 34B. Lens elements 34A and 34B may include any desired types of lens elements. If desired, physical light stops such as optical absorbers 114 may be placed at one or more locations in lens 34 (e.g., in gap 110, around lens elements 34A, etc.) to help mitigate stray light in the system.

Lens elements 34A may be separated from lens elements 34B in lens 34 by gap 110. Gap 110 may be greater than the distance between adjacent lens elements 34B and greater than the distance between adjacent lens elements 34A, for example. Lens elements 34A may receive light 22 from display module 14A. Lens elements 34A may focus (converge) light 22 at point (pupil) 112 between lens elements 34A and lens elements 34B. The rays of light 22 may then reach lens elements 34B, which redirect the light towards waveguide 26 (e.g., surface 42 of waveguide 26 as shown in FIGS. 3-8 and 10). Arranging the lens elements in lens 34 in this way may allow lens 34 to exhibit a length 116 and a width 118. Length 116 of lens 34 in FIG. 11 may, for example, be greater than the length 50 of lens 34 in scenarios where only a single group of lens elements is used (e.g., as shown in FIG. 3). However, width 118 may be less than the width 52 of lens 34 in scenarios where only a single group of lens elements is used (e.g., as shown in FIG. 3). This may, for example, reduce the amount of space required within device 10 of FIG. 1 without sacrificing image quality. The example of FIG. 11 is merely illustrative and, if desired, other lens element arrangements may be used.

Figure 12:
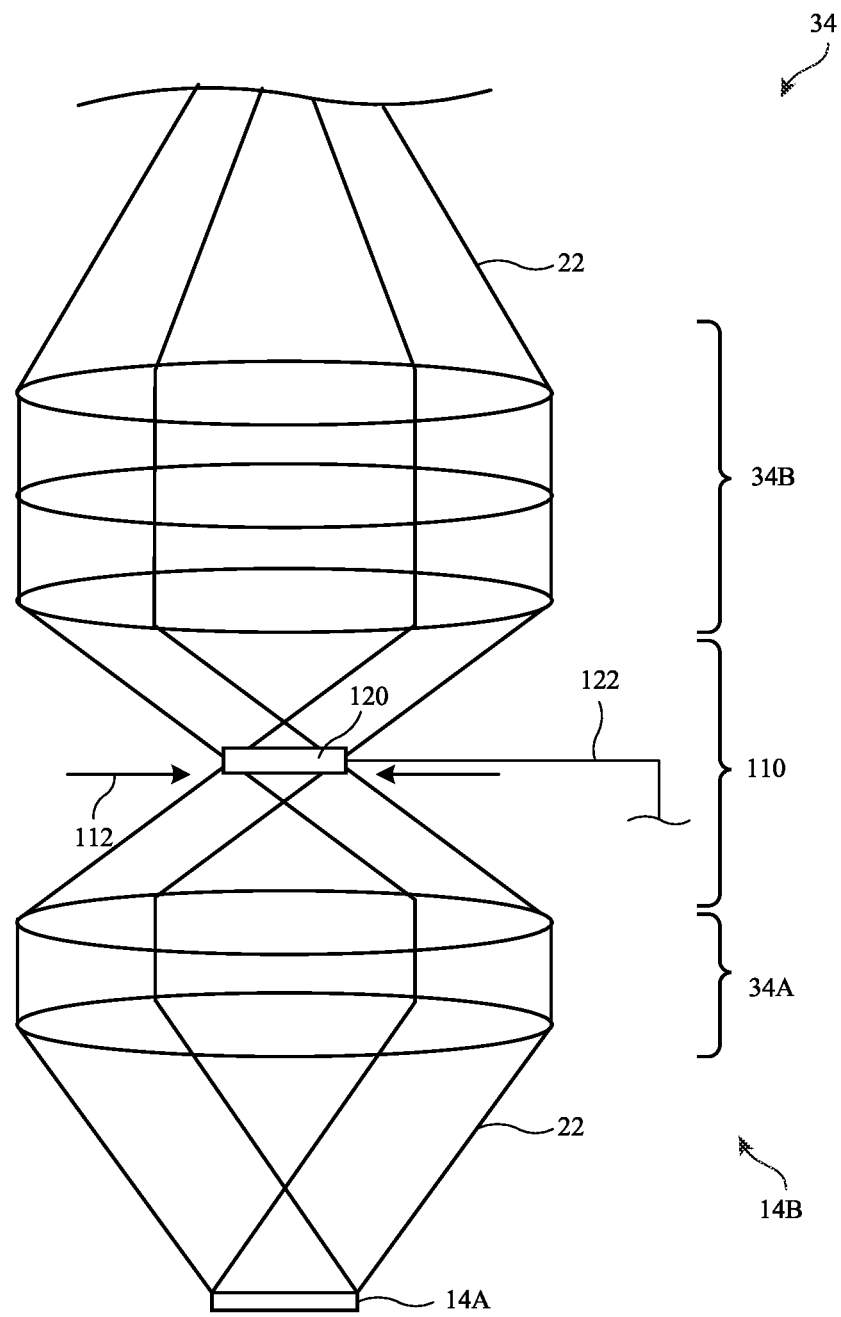
FIG. 12 is a top view showing how an illustrative switchable light displacing element may be mounted within a split multi-element lens of the type shown in FIG. 11 in accordance with some embodiments.

If desired, a switchable element may be mounted within gap 110 of lens 34 to help increase the effective resolution of display 14. FIG. 12 is a diagram showing how a switchable element may be mounted within gap 110 of lens 34 to help increase the effective resolution of display 14. As shown in FIG. 12, a switchable element such as switchable light displacing element 120 may be mounted at point 112 within gap 110. Switchable light displacing element 120 may be a flat transparent plate (e.g., a glass plate, plastic plate, etc.) that is switchable between first and second states.

In the first state, switchable light displacing element 120 may have a first orientation. In the second state, switchable light displacing element 120 may have a second orientation. Switchable light displacing element 120 may include MEMs structures, piezoelectric structures, or other structures for adjusting the orientation of the switchable element so that the switchable element is placed in a selected one of the first and second states. Switchable light displacing element 120 may receive control signals over control path 122 (e.g., from control circuitry 16 of FIG. 1) that place switchable light displacing element 120 into a selected one of the first and second states at any given time.

Figure 13:
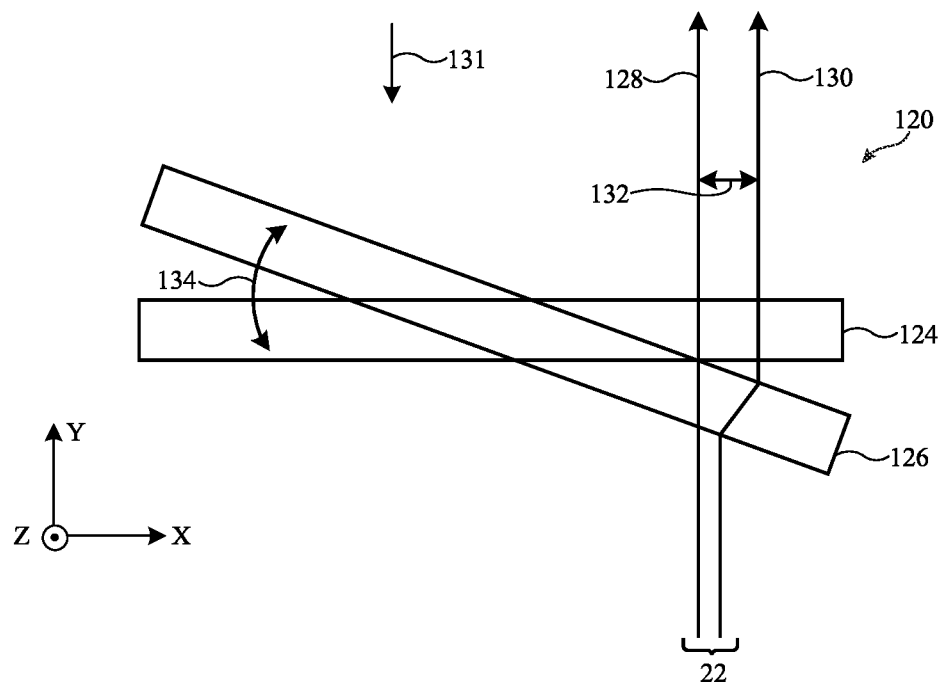
FIG. 13 is a top view showing how a switchable light displacing element of the type shown in FIG. 12 may be adjusted between first and second states for displacing image light in accordance with some embodiments.

FIG. 13 is a diagram showing how switchable light displacing element 120 may be placed into the first and second states. As shown in FIG. 13, switchable light displacing element 120 may have a first orientation such as first orientation 124 in the first state. Switchable light displacing element 120 may have a second orientation such as second orientation 126 in the second state. Light 22 from a single pixel in display module 14A is shown in the example of FIG. 13 for the sake of clarity. In general, light 22 is received at switchable light displacing element 120 for each pixel in the display module.

In the first state, light 22 may pass directly through switchable light displacing element 120, as shown by ray 128. In the first state, light 22 may be incident upon switchable light displacing element 120 parallel to a normal axis of the lateral area of switchable light displacing element 120. This may allow light 22 to pass through switchable light displacing element 120 without refracting. In the second state, light 22 may be incident upon switchable light displacing element 120 at a non-zero angle with respect to the normal axis of switchable light displacing element 120. This may cause light 22 to refract prior to being output by switchable light displacing element 120, as shown by ray 130. This may cause light 22 (ray 130) to be displaced in the second state by an offset such as offset 132 relative to the first state (ray 128).

The control circuitry may rapidly toggle (e.g., rotate) switchable light displacing element 120 between the first and second states, as shown by arrow 134, so that the light 22 is provided to the waveguide with a first alignment, as shown by ray 128, and a second alignment (e.g., a second alignment that is parallel to and offset from the first alignment), as shown by ray 130. Similar rays are produced for each pixel in the display, such that the first and second alignments collectively cause the light to exhibit a greater resolution than would otherwise be available in the absence of switchable light displacing element 120. Switchable light displacing element 120 may be switched between the first and second states at a speed greater than the response speed of the human eye (e.g., greater than 60 Hz , greater than 120 Hz, greater than 240 Hz, greater than 1 kHz, greater than 10 kHz, etc.) so that a user at eye box 24 (FIG. 2) is unable to perceive each state. In this way, light 22 may be coupled into waveguide 26 and provided to the eye box with a greater effective resolution than would otherwise be provided to the eye box in the absence of switchable light displacing element 120.

Figure 14:
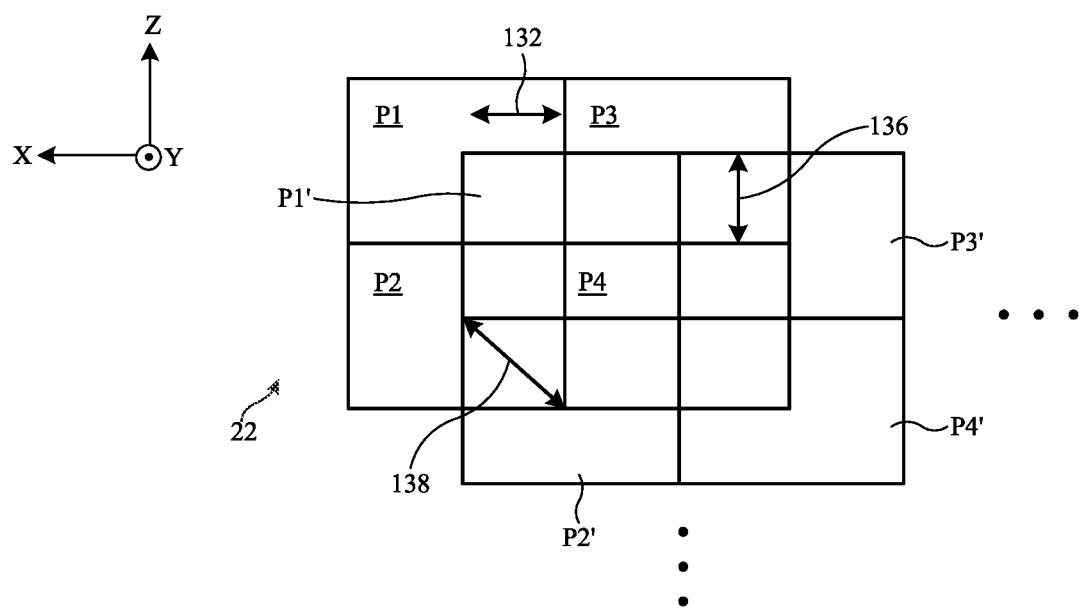
FIG. 14 is a front view of pixels of image light that illustrates how an illustrative switchable light displacing element of the type shown in FIGS. 12 and 13 may increase the effective resolution of the image light in accordance with some embodiments.

FIG. 14 is a front view showing how switchable light displacing element 120 may provide light 22 with an increased effective resolution to the waveguide (e.g., as taken in the direction of arrow 131 of FIG. 14). In the example of FIG. 14, four pixels of light 22 are shown for the sake of clarity. In general, light 22 and the display module may include any desired number of pixels.

As shown in FIG. 14, light 22 may include pixels P1, P2, P3, and P4 when switchable light displacing element 120 is in the first state (e.g., orientation 124 of FIG. 13). When switchable light displacing element 120 is in the second state (e.g., orientation 126 of FIG. 13), pixels P1, P2, P3, and P4 may be displaced by displacement 138, as shown by respective pixels P1', P2', P3', and P4'. Displacement 138 may, for example, be a two-dimensional displacement that includes offset 136 parallel to the Z-axis and/or offset 132 parallel to the X-axis.

Pixels P1, P2, P3, and P4 may exhibit a first pixel pitch and pixels P1', P2', P3', and P4' may exhibit the first pixel pitch. However, the combination of pixels P1, P2, P3, and P4 with pixels P1', P2', P3', and P4' may exhibit a second pixel pitch that is less than (e.g., half) the first pixel pitch. By rapidly toggling between the first and second states, light 22 may effectively include each of pixels P1, P2, P3, P4, P1', P2', P3', and P4' (e.g., as perceived by a user at the eye box) and thus the second pixel pitch, rather than only pixels P1, P2, P3, and P4 and the first pixel pitch (e.g., in scenarios where switchable light displacing element 120 is omitted). This may serve to increase the effective resolution of light 22 relative to scenarios where switchable light displacing element 120 is omitted (e.g., to twice the resolution that light 22 would otherwise have in the absence of switchable light displacing element 120), without requiring an increase in size or processing resources for display module 14A.

Figure 15:
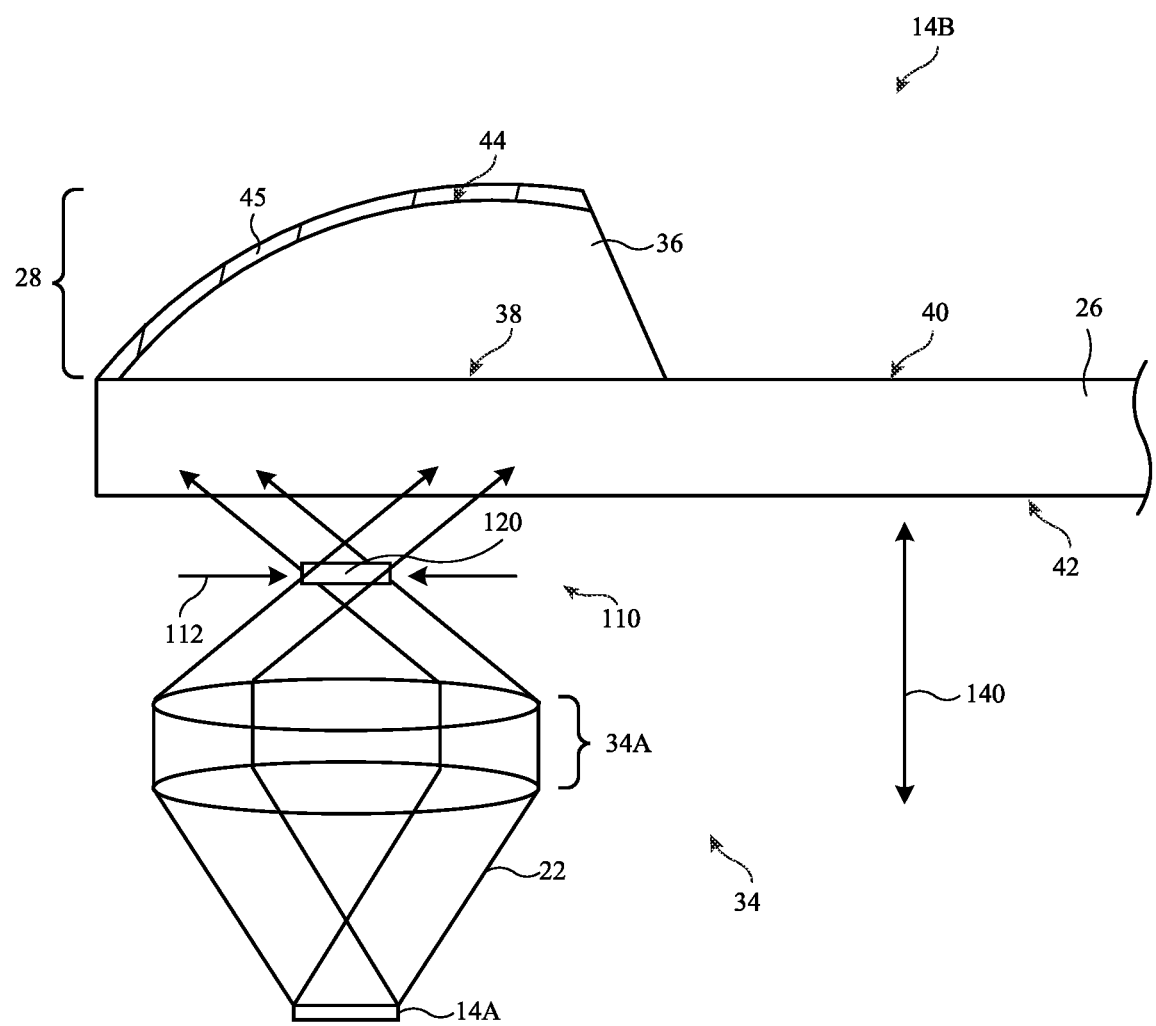
FIG. 15 is a top view showing how an input coupler formed from a reflective prism with a curved reflective surface may form part of a split multi-element lens in accordance with some embodiments.

In scenarios where prism 36 includes a curved reflective surface (e.g., surface 44 of FIG. 4), the optical power introduced by the curved reflective surface may allow lens elements 34B of lens 34 (FIGS. 11 and 12) to be omitted. FIG. 15 is a diagram showing how the curved reflective surface of prism 36 may replace lens elements 34B of FIGS. 11 and 12.

As shown in FIG. 15, lens elements 34A of lens 34 may converge light 22 at point 112. Light 22 may subsequently pass through waveguide 26 to prism 36 and may be reflected off of the curved surface 44 of prism 36. The curve of surface 44 may introduce optical power to the light that would otherwise have been introduced by lens elements 34B of FIGS. 11 and 12. This may allow lens elements 34B to be omitted, allowing lens elements 34A to be placed closer to waveguide 26 than in scenarios where lens elements 34B are included in lens 34. For example, there may be a distance 140 between the input to lens 34 and surface 42 of waveguide 26, where distance 140 is less than length 116 of FIG. 11 and distance 53 of FIG. 3. Switchable light displacing element 120 may be mounted at point 112 for increasing the effective resolution of light 22 if desired.

The example of FIG. 15 is merely illustrative. If desired, reflective layer 45 may be layered onto surface 44 or may be omitted. Switchable light displacing element 120 may be omitted if desired. Prism 36 of FIG. 15 may include one or more wedges such as wedges 76 and 78 of FIGS. 6-8 and 10). Surface 44 may have any desired free-form curved shape. Any desired combination of the arrangements of FIGS. 3-15 may be used.

Figure 16:
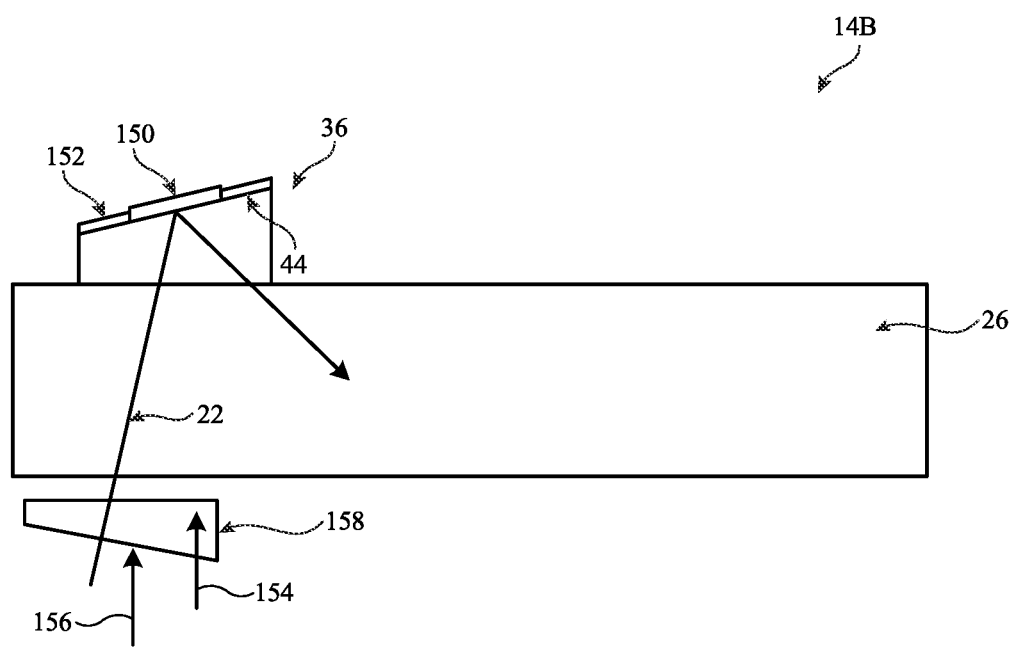
FIG. 16 is a top view showing how an input coupler formed from a reflective prism may receive image light through a dispersion compensation wedge and/or may include an optical absorber in accordance with some embodiments.

In practice, display module 14A and lens 34 may focus image light 22 onto the reflective surface(s) of prism 36 within a corresponding pupil. If desired, the structures layered onto the reflective surface(s) of prism 36 may extend over (overlap) only a portion of the reflective surface(s), where the portion overlaps the pupil of the image light 22 focused on the reflective surface(s) (e.g., the portion may have the same size and shape as the pupil or may be slightly larger than the pupil). The remainder of the reflective surface(s) may be covered (overlapped) by an optical absorber that serves as a physical stop for the image light. For example, as shown in FIG. 16, prism 36 may include reflective layer 150 on reflective surface 44 that reflects image light 22 into waveguide 26. The size of reflective layer 150 may match the pupil size of image light 22. The remainder of reflective surface 44 may be covered by optical absorber 152. This example is merely illustrative and, in general, reflective layer 45 of FIGS. 3, 4, 6-8, and 15, switchable reflective layer 56 of FIG. 5, polarization-sensitive reflective film 74 of FIGS. 6 and 8, and switchable reflective layer 88 of FIG. 7 may overlap only a portion of the corresponding reflective surface of prism 36 that overlaps (e.g., matches) the area spanned by the pupil of image light 22 focused on the reflective surface (e.g., as shown by reflective layer 150 of FIG. 16), whereas the remainder of the reflective surface is covered with an optical absorber (e.g., as shown by optical absorber 152 of FIG. 16). This may serve to minimize stray light in optical system 14B, thereby maximizing the contrast of images provided at eye box 24.

If desired, an optional optical wedge such may be interposed on the optical path between waveguide 26 and display modules 14A, as shown by optical wedge 158 of FIG. 16. Optical wedge 158 may have a first surface 154 facing and parallel to the lateral surface of waveguide 26. Optical wedge 158 may have an opposing second surface 156 that is oriented at a non-parallel angle (e.g., tilted) with respect to first surface 154. Image light 22 may pass through optical wedge 158 before passing through waveguide 26. Optical wedge 158 may be a dispersion compensation wedge that compensates for dispersion of image light 22 by prism 36 and/or the other optical components of the system (e.g., in scenarios where prism 36 has a refractive index as a function of wavelength that is different from the bulk refractive index as a function of wavelength of the grating medium in waveguide 26). If desired, optical wedge 158 may additionally or alternatively help redirect image light 22 incident at other angles (e.g., angles non-parallel with respect to the Y-axis) towards prism 36. This may allow display module 14A to be mounted at different locations or orientations with respect to waveguide 26 than would otherwise be possible in the absence of the optical wedge. For example, the optical wedge may allow display module 14A to be located within a main frame for waveguide 26 (e.g., within support structures 20 of FIG. 1) without needing to be located in the temple or other portions of the support structures (e.g., thereby optimizing space consumption within system 10). Optical wedge 158 of FIG. 16 may be interposed on the optical path for image light 22 between waveguide 26 and display module 14A in any of the arrangements of FIGS. 3-8, 10, and 15 if desired.

In accordance with an embodiment, a display system is provided that includes a display module that produces image light, a waveguide, a reflective input coupling prism mounted to the waveguide, the reflective input coupling prism is configured to receive the image light through the waveguide, the reflective input coupling prism is configured to reflect the image light into the waveguide, and the waveguide is configured to propagate the reflected image light via total internal reflection, and an output coupler on the waveguide and configured to couple the reflected image light out of the waveguide.

In accordance with another embodiment, the output coupler includes diffractive grating structures in a grating medium embedded within the waveguide, the diffractive grating structures include volume holograms, and the display system includes a dispersion compensation wedge optically interposed between the display module and the waveguide.

In accordance with another embodiment, the reflective input coupling prism has a reflective surface configured to reflect the image light into the waveguide, the display system includes a reflective layer on the reflective surface.

In accordance with another embodiment, the reflective layer includes a switchable reflective layer, the switchable reflective layer being adjustable between a first state at which the switchable reflective layer reflects the image light into the waveguide in a first direction and a second state at which the switchable reflective layer reflects the image light into the waveguide in a second direction that is different from the first direction, and the switchable reflective layer includes a structure selected from the group consisting of a switchable liquid crystal grating and a digital micromirror device.

In accordance with another embodiment, the reflective layer includes a layer selected from the group consisting of a dielectric layer, a metallic layer, a layer of three-dimensional metal structures, and a layer of diffractive gratings.

In accordance with another embodiment, the reflective surface includes a curved surface that is configured to provide the reflected light with an optical power.

In accordance with another embodiment, the reflective layer covers a portion of the reflective surface that overlaps a pupil of the image light that has been focused onto the reflective surface and the display system includes an optical absorber that covers a remainder of the reflective surface.

In accordance with another embodiment, the display includes a lens configured to direct the image light from the display module towards the waveguide, the lens is configured to converge the image light at a location interposed between the waveguide and the lens, and a transparent plate at the location, the transparent plate being adjustable between a first orientation at which the transparent plate directs the image light towards the waveguide with a first alignment and a second orientation at which the transparent plate directs the image light towards the waveguide with a second alignment that is parallel to and offset from the first alignment.

In accordance with another embodiment, the waveguide has opposing first and second surfaces, the reflective input coupling prism includes a first wedge mounted to the first surface and a second wedge mounted to a surface of the first wedge, the second wedge includes the reflective surface, the surface of the first wedge is configured to reflect the image light into the waveguide in a first direction, and the reflective surface is configured to reflect the image light into the waveguide in a second direction that is different from the first direction.

In accordance with another embodiment, the reflective input coupling prism has a reflective surface configured to reflect the image light into the waveguide, the display includes
 a polarization-sensitive film interposed between the first and second wedges, the polarization-sensitive film is configured to reflect a first polarization of the image light in the first direction and to transmit a second polarization of the image light, and the reflective surface is configured to reflect, in the second direction, the second polarization of the image light transmitted by the polarization-sensitive film.

In accordance with another embodiment, the display includes a switchable polarizer, the switchable polarizer is switchable between first and second states, the switchable polarizer is configured to transmit, in the first state, the first polarization of the image light through the second surface of the waveguide, and the switchable polarizer is configured to transmit, in the second state, the second polarization of the image light through the second surface of the waveguide.

In accordance with another embodiment, the display module includes a first display panel configured to transmit the first polarization of the image light towards the reflective input coupling prism and the display module includes a second display panel configured to concurrently transmit the second polarization of the image light towards the reflective input coupling prism.

In accordance with another embodiment, the reflective input coupling prism has a reflective surface configured to reflect the image light into the waveguide, the waveguide has opposing first and second surfaces, the reflective input coupling prism includes a first wedge mounted to the first surface and a second wedge mounted to a surface of the first wedge, the second wedge includes the reflective surface, the surface of the first wedge is configured to reflect the image light into the waveguide in a first direction, and the reflective surface is configured to reflect the image light into the waveguide in a second direction that is different from the first direction, the display includes a switchable reflective layer interposed between the first and second wedges, the switchable reflective layer is switchable between first and second states, the switchable reflective layer is configured to reflect, in the first state, the image light in the first direction, the switchable reflective layer is configured to transmit, in the second state, the image light towards the reflective surface, and the switchable reflective layer includes a cholesteric liquid crystal reflector.

In accordance with another embodiment, the display includes a birefringent beam displacer configured to receive a pupil of image light, the birefringent beam displacer is configured to transmit a first polarization of the pupil towards the reflective input coupling prism within a first beam, and the birefringent beam displacer is configured to transmit a second polarization of the pupil towards the reflective input coupling prism in a second beam that is offset from the first beam.

In accordance with another embodiment, the waveguide has opposing first and second surfaces, the reflective input coupling prism includes a first wedge mounted to the first surface and a second wedge mounted to a surface of the first wedge, the birefringent beam displacer is mounted to the second surface, the first wedge has a first refractive index, and the second wedge has a second refractive index that is different from the first refractive index.

In accordance with another embodiment, the reflective input coupling prism includes a birefringent beam displacer.

In accordance with another embodiment, the display includes a lens configured to direct the image light from the display module towards the reflective input coupling prism, the lens includes a first set of lens elements, and a second set of lens elements separated from the first set of lens elements by a gap, the second set of lens elements is interposed between the first set of lens elements and the waveguide, and the first set of lens elements is configured to converge the image light at a location within the gap.

In accordance with another embodiment, the display includes a switchable element at the location within the gap, the switchable element is switchable between a first state at which the switchable element passes the image light to the second set of lens elements with a first alignment and a second state at which the switchable element passes the image light to the second set of lens elements with a second alignment that is displaced with respect to the first alignment, and the switchable element includes a transparent panel and a piezoelectric component configured to rotate the transparent panel between a first orientation in the first state and a second orientation in the second state.

In accordance with an embodiment, an electronic device is provided that includes a display module that produces image light, a waveguide having opposing first and second surfaces, collimating optics that direct the image light towards the second surface of the waveguide, and an input coupling prism configured to receive the image light from the collimating optics through the waveguide, the input coupling prism includes a first wedge mounted to the first surface of the waveguide and having a first reflective surface oriented at a first angle with respect to the first surface of the waveguide, the first wedge is configured to reflect the image light into the waveguide in a first direction, and a second wedge mounted to the first reflective surface and having a second reflective surface oriented at a second angle with respect to the first surface of the waveguide, the second angle is greater than the first angle, the second wedge is configured to receive the image light through the first wedge, and the second wedge is configured to reflect the image light into the waveguide in a second direction that is different from the first direction.

In accordance with another embodiment, the electronic device includes a polarizing beam splitter layered on the first reflective surface.

In accordance with another embodiment, the electronic device includes a switchable reflective layer on the first reflective surface.

In accordance with another embodiment, the first wedge has a first refractive index and the second wedge has a second refractive index that is different from the first refractive index.

In accordance with another embodiment, the second reflective surface is curved and the first reflective surface is curved.

In accordance with an embodiment, a display is provided that includes a display module that generates image light, a waveguide having opposing first and second surfaces, a lens configured to direct the image light towards the second surface of the waveguide, the lens includes a set of lens elements configured to converge the image light at a location interposed between the set of lens elements and the second surface of the waveguide, and a reflective input coupling prism mounted to the first surface of the waveguide and configured to receive the image light from the lens through the waveguide, the reflective input coupling prism is configured to reflect the image light into the waveguide.

In accordance with another embodiment, the lens includes an additional set of lens elements interposed between the location and the second surface of the waveguide, including a transparent panel at the location, the transparent panel is switchable between first and second orientations, the transparent panel is configured to pass, in the first orientation, the image light to the second set of lens elements with a first alignment, and the transparent panel is configured to pass, in the second orientation, the image light to the second set of lens elements with a second alignment that is offset from the first alignment.

The foregoing is merely illustrative and various modifications can be made to the described embodiments. The foregoing embodiments may be implemented individually or in any combination.

What is claimed is:

1. An electronic device comprising:
  a projector configured to output light;
  a waveguide;
  an input coupler comprising a prism configured to couple the light into the waveguide, the waveguide being configured to propagate the light via total internal reflection; and
  an optical wedge optically coupled between the projector and the waveguide, wherein the optical wedge is configured to direct the light from the projector towards the input coupler.

2. The electronic device of claim 1, wherein the optical wedge has a first surface configured to transmit the light and a second surface opposite the first surface and configured to transmit the light, the second surface being non-parallel with respect to the first surface.

3. The electronic device of claim 2, wherein the first surface faces the waveguide and is parallel to a first lateral surface of the waveguide.

4. The electronic device of claim 3, wherein the waveguide has a second lateral surface opposite the first lateral surface, wherein the prism is mounted to the second lateral surface, and wherein the first lateral surface is parallel to the second lateral surface.

5. The electronic device of claim 1, further comprising:
  an output coupler configured to couple the light out of the waveguide.

6. The electronic device of claim 1, wherein the optical wedge comprises a dispersion compensation wedge configured to compensate for dispersion of the light by the input coupler.

7. The electronic device of claim 1, wherein the prism is a reflective prism with a reflective surface configured to reflect the light into the waveguide.

8. The electronic device of claim 7, further comprising:
  a reflective layer that covers a portion of the reflective surface that overlaps a pupil of the light that has been focused onto the reflective surface; and
  an optical absorber that covers a remainder of the reflective surface.

9. A display comprising:
  a projector configured to generate light;
  a waveguide;
  an input coupler, wherein the input coupler is configured to couple the light into the waveguide; and
  a birefringent beam displacer configured to receive a pupil of the light from the projector, wherein the birefringent beam displacer is configured to transmit a first polarization of the pupil towards the input coupler within a first beam, wherein the birefringent beam displacer is configured to transmit a second polarization of the pupil towards the input coupler in a second beam that is offset from the first beam, and wherein the second polarization is different from the first polarization.

10. The display of claim 9, wherein the birefringent beam displacer is optically interposed between the waveguide and the projector.

11. The display of claim 10, wherein the birefringent beam displacer is mounted to a surface of the waveguide.

12. The display of claim 9, wherein the waveguide is interposed between the birefringent beam displacer and the input coupler.

13. The display of claim 9, wherein the birefringent beam displacer is configured to split the pupil of the light from the projector into the first beam and the second beam.

14. The display of claim 9, wherein the first beam and the second beam collectively exhibit an expanded pupil of light that is larger than the pupil of light.

15. A display comprising:
  a projector that produces light;

a waveguide having opposing first and second surfaces, wherein the waveguide is configured to propagate the light via total internal reflection; and an input coupling prism configured to receive the light, wherein the input coupling prism comprises:

a first wedge mounted to the first surface of the waveguide, wherein the first wedge is configured to couple the light into the waveguide in a first direction, and a second wedge mounted to a surface of the first wedge, wherein the second wedge is configured to couple the light into the first wedge in a second direction that is non-parallel to the first direction.

16. The display of claim 15, further comprising:

a polarizing beam splitter or a switchable reflective layer interposed between the first and second wedges.

17. The display of claim 15, further comprising collimating optics that direct the light towards the second surface of the waveguide, wherein the input coupling prism is configured to receive the light from the collimating optics.

18. The display of claim 15, wherein the surface of the first wedge is oriented at a first angle with respect to the first surface of the waveguide, the second wedge has an additional surface oriented at a second angle with respect to the first surface of the waveguide, and the second angle is greater than the first angle.

19. The display of claim 15, wherein the surface of the first wedge is curved and wherein an additional surface of the second wedge is curved.

20. A display comprising:

a projector that produces light;

a waveguide having opposing first and second surfaces; and an input coupling prism configured to receive the light, wherein the input coupling prism comprises:

a first wedge with a first refractive index and mounted to the first surface of the waveguide, wherein the first wedge is configured to couple the light into the waveguide in a first direction, and a second wedge with a second refractive index different from the first refractive index and mounted to a surface of the first wedge, wherein the second wedge is configured to couple the light into the first wedge in a second direction that is non-parallel to the first direction.

* * * * *